United States Patent
Paw

(10) Patent No.: US 10,103,912 B1
(45) Date of Patent: Oct. 16, 2018

(54) PHASED INFORMATION PULSE METHOD AND APPARATUS

(71) Applicant: Ervin A Paw, Randolph, NJ (US)

(72) Inventor: Ervin A Paw, Randolph, NJ (US)

( * ) Notice: Subject to any disclaimer, the term of this patent is extended or adjusted under 35 U.S.C. 154(b) by 0 days.

(21) Appl. No.: 15/136,594

(22) Filed: Apr. 22, 2016

(51) Int. Cl.
    *H04L 25/49* (2006.01)
    *H04B 1/40* (2015.01)

(52) U.S. Cl.
    CPC ........... *H04L 25/4906* (2013.01); *H04B 1/40* (2013.01); *H04L 25/4902* (2013.01)

(58) Field of Classification Search
    CPC ............ H03M 5/04; H03M 5/08; H03M 5/16; H03M 7/30; H03M 7/3053; H03M 7/3055; H03M 7/3059; H04B 1/38; H04B 1/40; H04L 25/49; H04L 25/4902; H04L 25/4904; H04L 25/4906; H04L 25/4917; H04L 25/4921
    USPC ....... 375/219, 220, 222, 223, 238, 239, 241, 375/242, 243, 245, 246, 253, 257, 259, 375/280, 281, 308; 341/51, 52, 56, 57, 341/61, 62; 370/212, 213
See application file for complete search history.

(56) References Cited

U.S. PATENT DOCUMENTS

| | | | | |
|---|---|---|---|---|
| 3,922,493 A | * | 11/1975 | Brenig | H04J 3/047 370/477 |
| 5,010,333 A | * | 4/1991 | Gardner | E21B 47/12 340/854.1 |
| 6,914,637 B1 | * | 7/2005 | Wolf | H04L 1/0057 348/473 |
| 2003/0043888 A1 | * | 3/2003 | Kim | H04L 1/0043 375/146 |
| 2005/0141716 A1 | * | 6/2005 | Kumar | H04B 10/70 380/255 |
| 2006/0139189 A1 | * | 6/2006 | Sadowsky | H03M 7/16 341/62 |
| 2008/0118164 A1 | * | 5/2008 | Hu | H04N 19/126 382/237 |
| 2012/0030375 A1 | * | 2/2012 | Schulenburg | G06F 17/2217 709/246 |
| 2016/0226587 A1 | * | 8/2016 | Iizuka | H04B 10/116 |

* cited by examiner

Primary Examiner — Young T Tse
(74) Attorney, Agent, or Firm — Richard A. Joel, Esq.

(57) ABSTRACT

Data communication/transfer has been in binary form from the first simple service through today's complex internet systems. Binary uses zeros and ones transmitted as voltage changes. The invention introduces multi-state digits beyond zeroes and ones to a multi-schema, one, two, three and/or more, thus increasing capacity and speed of data transfer. The present invention uses an electrical pulse that can be phased to communicate the binary data in a multi-phased format. The phased information pulse results in a significant increase in combinations used for the transfer of information. This format improves capacity utilization of networks, increases data transfer speed and secondly provides new opportunities for applications. In the future, the invention can also provide added benefits in data centers and communications security.

5 Claims, 10 Drawing Sheets

FIG. 2

FIG. 3
ASCII to Binary to Quad

| ASCII | | | Quad | | | | Combination |
|---|---|---|---|---|---|---|---|
| Text | ASCII | Binary | Position 4 | Position 3 | Position 2 | Position 1 | |
| n/a | chr(0) | 00000000 | 0 | 0 | 0 | 0 | 1 |
| n/a | chr(1) | 00000001 | 0 | 0 | 0 | 1 | 2 |
| n/a | chr(2) | 00000010 | 0 | 0 | 1 | 1 | 3 |
| n/a | chr(3) | 00000011 | 0 | 0 | 1 | 0 | 4 |
| n/a | chr(4) | 00000100 | 0 | 0 | 0 | 2 | 5 |
| n/a | chr(5) | 00000101 | 0 | 0 | 2 | 2 | 6 |
| n/a | chr(6) | 00000110 | 0 | 0 | 2 | 0 | 7 |
| n/a | chr(7) | 00000111 | 0 | 0 | 2 | 1 | 8 |
| n/a | chr(8) | 00001000 | 0 | 0 | 1 | 2 | 9 |
| n/a | chr(9) | 00001001 | 0 | 0 | 2 | 3 | 10 |
| n/a | chr(10) | 00001010 | 0 | 0 | 0 | 3 | 11 |
| n/a | chr(11) | 00001011 | 0 | 0 | 3 | 0 | 12 |
| n/a | chr(12) | 00001100 | 0 | 0 | 3 | 1 | 13 |
| n/a | chr(13) | 00001101 | 0 | 0 | 3 | 2 | 14 |
| n/a | chr(14) | 00001110 | 0 | 0 | 1 | 3 | 15 |
| n/a | chr(15) | 00001111 | 0 | 0 | 3 | 3 | 16 |
| n/a | chr(16) | 00010000 | 0 | 1 | 0 | 0 | 17 |
| n/a | chr(17) | 00010001 | 0 | 1 | 0 | 1 | 18 |
| n/a | chr(18) | 00010010 | 0 | 1 | 1 | 1 | 19 |
| n/a | chr(19) | 00010011 | 0 | 1 | 1 | 0 | 20 |
| n/a | chr(20) | 00010100 | 0 | 1 | 0 | 2 | 21 |
| n/a | chr(21) | 00010101 | 0 | 1 | 2 | 2 | 22 |
| n/a | chr(22) | 00010110 | 0 | 1 | 2 | 0 | 23 |
| n/a | chr(23) | 00010111 | 0 | 1 | 2 | 1 | 24 |
| n/a | chr(24) | 00011000 | 0 | 1 | 1 | 2 | 25 |
| n/a | chr(25) | 00011001 | 0 | 1 | 2 | 3 | 26 |
| n/a | chr(26) | 00011010 | 0 | 1 | 0 | 3 | 27 |
| n/a | chr(27) | 00011011 | 0 | 1 | 3 | 0 | 28 |
| n/a | chr(28) | 00011100 | 0 | 1 | 3 | 1 | 29 |
| n/a | chr(29) | 00011101 | 0 | 1 | 3 | 2 | 30 |
| n/a | chr(30) | 00011110 | 0 | 1 | 1 | 3 | 31 |
| n/a | chr(31) | 00011111 | 0 | 1 | 3 | 3 | 32 |
|  | chr(32) | 00100000 | 0 | 2 | 0 | 0 | 33 |
| ! | chr(33) | 00100001 | 0 | 2 | 0 | 1 | 34 |

FIG. 3--Continued
ASCII to Binary to Quad

| ASCII | | | Quad | | | | Combination |
|---|---|---|---|---|---|---|---|
| Text | ASCII | Binary | Position 4 | Position 3 | Position 2 | Position 1 | |
| " | chr(34) | 00100010 | 0 | 2 | 1 | 1 | 35 |
| # | chr(35) | 00100011 | 0 | 2 | 1 | 0 | 36 |
| $ | chr(36) | 00100100 | 0 | 2 | 0 | 2 | 37 |
| % | chr(37) | 00100101 | 0 | 2 | 2 | 2 | 38 |
| & | chr(38) | 00100110 | 0 | 2 | 2 | 0 | 39 |
| ' | chr(39) | 00100111 | 0 | 2 | 2 | 1 | 40 |
| ( | chr(40) | 00101000 | 0 | 2 | 1 | 2 | 41 |
| ) | chr(41) | 00101001 | 0 | 2 | 2 | 3 | 42 |
| * | chr(42) | 00101010 | 0 | 2 | 0 | 3 | 43 |
| + | chr(43) | 00101011 | 0 | 2 | 3 | 0 | 44 |
| , | chr(44) | 00101100 | 0 | 2 | 3 | 1 | 45 |
| - | chr(45) | 00101101 | 0 | 2 | 3 | 2 | 46 |
| . | chr(46) | 00101110 | 0 | 2 | 1 | 3 | 47 |
| / | chr(47) | 00101111 | 0 | 2 | 3 | 3 | 48 |
| 0 | chr(48) | 00110000 | 0 | 3 | 0 | 0 | 49 |
| 1 | chr(49) | 00110001 | 0 | 3 | 0 | 1 | 50 |
| 2 | chr(50) | 00110010 | 0 | 3 | 1 | 1 | 51 |
| 3 | chr(51) | 00110011 | 0 | 3 | 1 | 0 | 52 |
| 4 | chr(52) | 00110100 | 0 | 3 | 0 | 2 | 53 |
| 5 | chr(53) | 00110101 | 0 | 3 | 2 | 2 | 54 |
| 6 | chr(54) | 00110110 | 0 | 3 | 2 | 0 | 55 |
| 7 | chr(55) | 00110111 | 0 | 3 | 2 | 1 | 56 |
| 8 | chr(56) | 00111000 | 0 | 3 | 1 | 2 | 57 |
| 9 | chr(57) | 00111001 | 0 | 3 | 2 | 3 | 58 |
| : | chr(58) | 00111010 | 0 | 3 | 0 | 3 | 59 |
| ; | chr(59) | 00111011 | 0 | 3 | 3 | 0 | 60 |
| < | chr(60) | 00111100 | 0 | 3 | 3 | 1 | 61 |
| = | chr(61) | 00111101 | 0 | 3 | 3 | 2 | 62 |
| > | chr(62) | 00111110 | 0 | 3 | 1 | 3 | 63 |
| ? | chr(63) | 00111111 | 0 | 3 | 3 | 3 | 64 |
| @ | chr(64) | 01000000 | 1 | 0 | 0 | 0 | 65 |
| A | chr(65) | 01000001 | 1 | 0 | 0 | 1 | 66 |
| B | chr(66) | 01000010 | 1 | 0 | 1 | 1 | 67 |
| C | chr(67) | 01000011 | 1 | 0 | 1 | 0 | 68 |

FIG. 3--Continued
ASCII to Binary to Quad

| ASCII | | | Quad | | | | Combination |
|---|---|---|---|---|---|---|---|
| Text | ASCII | Binary | Position 4 | Position 3 | Position 2 | Position 1 | |
| D | chr(68) | 01000100 | 1 | 0 | 0 | 2 | 69 |
| E | chr(69) | 01000101 | 1 | 0 | 2 | 2 | 70 |
| F | chr(70) | 01000110 | 1 | 0 | 2 | 0 | 71 |
| G | chr(71) | 01000111 | 1 | 0 | 2 | 1 | 72 |
| H | chr(72) | 01001000 | 1 | 0 | 1 | 2 | 73 |
| I | chr(73) | 01001001 | 1 | 0 | 2 | 3 | 74 |
| J | chr(74) | 01001010 | 1 | 0 | 0 | 3 | 75 |
| K | chr(75) | 01001011 | 1 | 0 | 3 | 0 | 76 |
| L | chr(76) | 01001100 | 1 | 0 | 3 | 1 | 77 |
| M | chr(77) | 01001101 | 1 | 0 | 3 | 2 | 78 |
| N | chr(78) | 01001110 | 1 | 0 | 1 | 3 | 79 |
| O | chr(79) | 01001111 | 1 | 0 | 3 | 3 | 80 |
| P | chr(80) | 01010000 | 1 | 1 | 0 | 0 | 81 |
| Q | chr(81) | 01010001 | 1 | 1 | 0 | 1 | 82 |
| R | chr(82) | 01010010 | 1 | 1 | 1 | 1 | 83 |
| S | chr(83) | 01010011 | 1 | 1 | 1 | 0 | 84 |
| T | chr(84) | 01010100 | 1 | 1 | 0 | 2 | 85 |
| U | chr(85) | 01010101 | 1 | 1 | 2 | 2 | 86 |
| V | chr(86) | 01010110 | 1 | 1 | 2 | 0 | 87 |
| W | chr(87) | 01010111 | 1 | 1 | 2 | 1 | 88 |
| X | chr(88) | 01011000 | 1 | 1 | 1 | 2 | 89 |
| Y | chr(89) | 01011001 | 1 | 1 | 2 | 3 | 90 |
| Z | chr(90) | 01011010 | 1 | 1 | 0 | 3 | 91 |
| [ | chr(91) | 01011011 | 1 | 1 | 3 | 0 | 92 |
| \ | chr(92) | 01011100 | 1 | 1 | 3 | 1 | 93 |
| ] | chr(93) | 01011101 | 1 | 1 | 3 | 2 | 94 |
| ^ | chr(94) | 01011110 | 1 | 1 | 1 | 3 | 95 |
| _ | chr(95) | 01011111 | 1 | 1 | 3 | 3 | 96 |
| ` | chr(96) | 01100000 | 1 | 2 | 0 | 0 | 97 |
| a | chr(97) | 01100001 | 1 | 2 | 0 | 1 | 98 |
| b | chr(98) | 01100010 | 1 | 2 | 1 | 1 | 99 |
| c | chr(99) | 01100011 | 1 | 2 | 1 | 0 | 100 |
| d | chr(100) | 01100100 | 1 | 2 | 0 | 2 | 101 |
| e | chr(101) | 01100101 | 1 | 2 | 2 | 2 | 102 |

FIG. 3--Continued
ASCII to Binary to Quad

| ASCII | | | Quad | | | | Combination |
|---|---|---|---|---|---|---|---|
| f | chr(102) | 01100110 | 1 | 2 | 2 | 0 | 103 |
| g | chr(103) | 01100111 | 1 | 2 | 2 | 1 | 104 |
| h | chr(104) | 01101000 | 1 | 2 | 1 | 2 | 105 |
| i | chr(105) | 01101001 | 1 | 2 | 2 | 3 | 106 |
| j | chr(106) | 01101010 | 1 | 2 | 0 | 3 | 107 |
| k | chr(107) | 01101011 | 1 | 2 | 3 | 0 | 108 |
| l | chr(108) | 01101100 | 1 | 2 | 3 | 1 | 109 |
| m | chr(109) | 01101101 | 1 | 2 | 3 | 2 | 110 |
| n | chr(110) | 01101110 | 1 | 2 | 1 | 3 | 111 |
| o | chr(111) | 01101111 | 1 | 2 | 3 | 3 | 112 |
| p | chr(112) | 01110000 | 1 | 3 | 0 | 0 | 113 |
| q | chr(113) | 01110001 | 1 | 3 | 0 | 1 | 114 |
| r | chr(114) | 01110010 | 1 | 3 | 1 | 1 | 115 |
| s | chr(115) | 01110011 | 1 | 3 | 1 | 0 | 116 |
| t | chr(116) | 01110100 | 1 | 3 | 0 | 2 | 117 |
| u | chr(117) | 01110101 | 1 | 3 | 2 | 2 | 118 |
| v | chr(118) | 01110110 | 1 | 3 | 2 | 0 | 119 |
| w | chr(119) | 01110111 | 1 | 3 | 2 | 1 | 120 |
| x | chr(120) | 01111000 | 1 | 3 | 1 | 2 | 121 |
| y | chr(121) | 01111001 | 1 | 3 | 2 | 3 | 122 |
| z | chr(122) | 01111010 | 1 | 3 | 0 | 3 | 123 |
| { | chr(123) | 01111011 | 1 | 3 | 3 | 0 | 124 |
| | | chr(124) | 01111100 | 1 | 3 | 3 | 1 | 125 |
| } | chr(125) | 01111101 | 1 | 3 | 3 | 2 | 126 |
| ~ | chr(126) | 01111110 | 1 | 3 | 1 | 3 | 127 |
| n/a | chr(127) | 01111111 | 1 | 3 | 3 | 3 | 128 |
| € | chr(128) | 10000000 | 2 | 0 | 0 | 0 | 129 |
| n/a | chr(129) | 10000001 | 2 | 0 | 0 | 1 | 130 |
| , | chr(130) | 10000010 | 2 | 0 | 1 | 1 | 131 |
| ƒ | chr(131) | 10000011 | 2 | 0 | 1 | 0 | 132 |
| „ | chr(132) | 10000100 | 2 | 0 | 0 | 2 | 133 |
| … | chr(133) | 10000101 | 2 | 0 | 2 | 2 | 134 |
| † | chr(134) | 10000110 | 2 | 0 | 2 | 0 | 135 |
| ‡ | chr(135) | 10000111 | 2 | 0 | 2 | 1 | 136 |

FIG. 3--Continued
ASCII to Binary to Quad

| ASCII | | | Quad | | | | Combination |
| --- | --- | --- | --- | --- | --- | --- | --- |
| Text | ASCII | Binary | Position 4 | Position 3 | Position 2 | Position 1 | |
| ˆ | chr(136) | 10001000 | 2 | 0 | 1 | 2 | 137 |
| ‰ | chr(137) | 10001001 | 2 | 0 | 2 | 3 | 138 |
| Š | chr(138) | 10001010 | 2 | 0 | 0 | 3 | 139 |
| ‹ | chr(139) | 10001011 | 2 | 0 | 3 | 0 | 140 |
| Œ | chr(140) | 10001100 | 2 | 0 | 3 | 1 | 141 |
| n/a | chr(141) | 10001101 | 2 | 0 | 3 | 2 | 142 |
| Ž | chr(142) | 10001110 | 2 | 0 | 1 | 3 | 143 |
| n/a | chr(143) | 10001111 | 2 | 0 | 3 | 3 | 144 |
| n/a | chr(144) | 10010000 | 2 | 1 | 0 | 0 | 145 |
| ' | chr(145) | 10010001 | 2 | 1 | 0 | 1 | 146 |
| ' | chr(146) | 10010010 | 2 | 1 | 1 | 1 | 147 |
| " | chr(147) | 10010011 | 2 | 1 | 1 | 0 | 148 |
| " | chr(148) | 10010100 | 2 | 1 | 0 | 2 | 149 |
| • | chr(149) | 10010101 | 2 | 1 | 2 | 2 | 150 |
| – | chr(150) | 10010110 | 2 | 1 | 2 | 0 | 151 |
| — | chr(151) | 10010111 | 2 | 1 | 2 | 1 | 152 |
| ˜ | chr(152) | 10011000 | 2 | 1 | 1 | 2 | 153 |
| ™ | chr(153) | 10011001 | 2 | 1 | 2 | 3 | 154 |
| š | chr(154) | 10011010 | 2 | 1 | 0 | 3 | 155 |
| › | chr(155) | 10011011 | 2 | 1 | 3 | 0 | 156 |
| œ | chr(156) | 10011100 | 2 | 1 | 3 | 1 | 157 |
| n/a | chr(157) | 10011101 | 2 | 1 | 3 | 2 | 158 |
| ž | chr(158) | 10011110 | 2 | 1 | 1 | 3 | 159 |
| Ÿ | chr(159) | 10011111 | 2 | 1 | 3 | 3 | 160 |
|  | chr(160) | 10100000 | 2 | 2 | 0 | 0 | 161 |
| ¡ | chr(161) | 10100001 | 2 | 2 | 0 | 1 | 162 |
| ¢ | chr(162) | 10100010 | 2 | 2 | 1 | 1 | 163 |
| £ | chr(163) | 10100011 | 2 | 2 | 1 | 0 | 164 |
| ¤ | chr(164) | 10100100 | 2 | 2 | 0 | 2 | 165 |
| ¥ | chr(165) | 10100101 | 2 | 2 | 2 | 2 | 166 |
| ¦ | chr(166) | 10100110 | 2 | 2 | 2 | 0 | 167 |
| § | chr(167) | 10100111 | 2 | 2 | 2 | 1 | 168 |
| ¨ | chr(168) | 10101000 | 2 | 2 | 1 | 2 | 169 |
| © | chr(169) | 10101001 | 2 | 2 | 2 | 3 | 170 |

FIG. 3--Continued
ASCII to Binary to Quad

| ASCII | | | Quad | | | | Combination |
| Text | ASCII | Binary | Position 4 | Position 3 | Position 2 | Position 1 | |
|---|---|---|---|---|---|---|---|
| ª | chr(170) | 10101010 | 2 | 2 | 0 | 3 | 171 |
| « | chr(171) | 10101011 | 2 | 2 | 3 | 0 | 172 |
| ¬ | chr(172) | 10101100 | 2 | 2 | 3 | 1 | 173 |
|  | chr(173) | 10101101 | 2 | 2 | 3 | 2 | 174 |
| ® | chr(174) | 10101110 | 2 | 2 | 1 | 3 | 175 |
|  | chr(175) | 10101111 | 2 | 2 | 3 | 3 | 176 |
| ° | chr(176) | 10110000 | 2 | 3 | 0 | 0 | 177 |
| ± | chr(177) | 10110001 | 2 | 3 | 0 | 1 | 178 |
| ² | chr(178) | 10110010 | 2 | 3 | 1 | 1 | 179 |
| ³ | chr(179) | 10110011 | 2 | 3 | 1 | 0 | 180 |
|  | chr(180) | 10110100 | 2 | 3 | 0 | 2 | 181 |
| µ | chr(181) | 10110101 | 2 | 3 | 2 | 2 | 182 |
| ¶ | chr(182) | 10110110 | 2 | 3 | 2 | 0 | 183 |
| · | chr(183) | 10110111 | 2 | 3 | 2 | 1 | 184 |
| ¸ | chr(184) | 10111000 | 2 | 3 | 1 | 2 | 185 |
| ¹ | chr(185) | 10111001 | 2 | 3 | 2 | 3 | 186 |
| º | chr(186) | 10111010 | 2 | 3 | 0 | 3 | 187 |
| » | chr(187) | 10111011 | 2 | 3 | 3 | 0 | 188 |
| ¼ | chr(188) | 10111100 | 2 | 3 | 3 | 1 | 189 |
| ½ | chr(189) | 10111101 | 2 | 3 | 3 | 2 | 190 |
| ¾ | chr(190) | 10111110 | 2 | 3 | 1 | 3 | 191 |
| ¿ | chr(191) | 10111111 | 2 | 3 | 3 | 3 | 192 |
| À | chr(192) | 11000000 | 3 | 0 | 0 | 0 | 193 |
| Á | chr(193) | 11000001 | 3 | 0 | 0 | 1 | 194 |
| Â | chr(194) | 11000010 | 3 | 0 | 1 | 1 | 195 |
| Ã | chr(195) | 11000011 | 3 | 0 | 1 | 0 | 196 |
| Ä | chr(196) | 11000100 | 3 | 0 | 0 | 2 | 197 |
| Å | chr(197) | 11000101 | 3 | 0 | 2 | 2 | 198 |
| Æ | chr(198) | 11000110 | 3 | 0 | 2 | 0 | 199 |
| Ç | chr(199) | 11000111 | 3 | 0 | 2 | 1 | 200 |
| È | chr(200) | 11001000 | 3 | 0 | 1 | 2 | 201 |
| É | chr(201) | 11001001 | 3 | 0 | 2 | 3 | 202 |
| Ê | chr(202) | 11001010 | 3 | 0 | 0 | 3 | 203 |
| Ë | chr(203) | 11001011 | 3 | 0 | 3 | 0 | 204 |

FIG. 3--Continued
ASCII to Binary to Quad

| ASCII | | | Quad | | | | Combination |
|---|---|---|---|---|---|---|---|
| Text | ASCII | Binary | Position 4 | Position 3 | Position 2 | Position 1 | |
| Ì | chr(204) | 11001100 | 3 | 0 | 3 | 1 | 205 |
| Í | chr(205) | 11001101 | 3 | 0 | 3 | 2 | 206 |
| Î | chr(206) | 11001110 | 3 | 0 | 1 | 3 | 207 |
| Ï | chr(207) | 11001111 | 3 | 0 | 3 | 3 | 208 |
| Ð | chr(208) | 11010000 | 3 | 1 | 0 | 0 | 209 |
| Ñ | chr(209) | 11010001 | 3 | 1 | 0 | 1 | 210 |
| Ò | chr(210) | 11010010 | 3 | 1 | 1 | 1 | 211 |
| Ó | chr(211) | 11010011 | 3 | 1 | 1 | 0 | 212 |
| Ô | chr(212) | 11010100 | 3 | 1 | 0 | 2 | 213 |
| Õ | chr(213) | 11010101 | 3 | 1 | 2 | 2 | 214 |
| Ö | chr(214) | 11010110 | 3 | 1 | 2 | 0 | 215 |
| × | chr(215) | 11010111 | 3 | 1 | 2 | 1 | 216 |
| Ø | chr(216) | 11011000 | 3 | 1 | 1 | 2 | 217 |
| Ù | chr(217) | 11011001 | 3 | 1 | 2 | 3 | 218 |
| Ú | chr(218) | 11011010 | 3 | 1 | 0 | 3 | 219 |
| Û | chr(219) | 11011011 | 3 | 1 | 3 | 0 | 220 |
| Ü | chr(220) | 11011100 | 3 | 1 | 3 | 1 | 221 |
| Ý | chr(221) | 11011101 | 3 | 1 | 3 | 2 | 222 |
| Þ | chr(222) | 11011110 | 3 | 1 | 1 | 3 | 223 |
| ß | chr(223) | 11011111 | 3 | 1 | 3 | 3 | 224 |
| à | chr(224) | 11100000 | 3 | 2 | 0 | 0 | 225 |
| á | chr(225) | 11100001 | 3 | 2 | 0 | 1 | 226 |
| â | chr(226) | 11100010 | 3 | 2 | 1 | 1 | 227 |
| ã | chr(227) | 11100011 | 3 | 2 | 1 | 0 | 228 |
| ä | chr(228) | 11100100 | 3 | 2 | 0 | 2 | 229 |
| å | chr(229) | 11100101 | 3 | 2 | 2 | 2 | 230 |
| æ | chr(230) | 11100110 | 3 | 2 | 2 | 0 | 231 |
| ç | chr(231) | 11100111 | 3 | 2 | 2 | 1 | 232 |
| è | chr(232) | 11101000 | 3 | 2 | 1 | 2 | 233 |
| é | chr(233) | 11101001 | 3 | 2 | 2 | 3 | 234 |
| ê | chr(234) | 11101010 | 3 | 2 | 0 | 3 | 235 |
| ë | chr(235) | 11101011 | 3 | 2 | 3 | 0 | 236 |
| ì | chr(236) | 11101100 | 3 | 2 | 3 | 1 | 237 |
| í | chr(237) | 11101101 | 3 | 2 | 3 | 2 | 238 |

FIG. 3--Continued
ASCII to Binary to Quad

| ASCII | | | Quad | | | | Combination |
|---|---|---|---|---|---|---|---|
| Text | ASCII | Binary | Position 4 | Position 3 | Position 2 | Position 1 | |
| ï | chr(238) | 11101110 | 3 | 2 | 1 | 3 | 239 |
| ï | chr(239) | 11101111 | 3 | 2 | 3 | 3 | 240 |
| ð | chr(240) | 11110000 | 3 | 3 | 0 | 0 | 241 |
| ñ | chr(241) | 11110001 | 3 | 3 | 0 | 1 | 242 |
| ò | chr(242) | 11110010 | 3 | 3 | 1 | 1 | 243 |
| ó | chr(243) | 11110011 | 3 | 3 | 1 | 0 | 244 |
| ô | chr(244) | 11110100 | 3 | 3 | 0 | 2 | 245 |
| õ | chr(245) | 11110101 | 3 | 3 | 2 | 2 | 246 |
| ö | chr(246) | 11110110 | 3 | 3 | 2 | 0 | 247 |
| ÷ | chr(247) | 11110111 | 3 | 3 | 2 | 1 | 248 |
| ø | chr(248) | 11111000 | 3 | 3 | 1 | 2 | 249 |
| ù | chr(249) | 11111001 | 3 | 3 | 2 | 3 | 250 |
| ú | chr(250) | 11111010 | 3 | 3 | 0 | 3 | 251 |
| û | chr(251) | 11111011 | 3 | 3 | 3 | 0 | 252 |
| ü | chr(252) | 11111100 | 3 | 3 | 3 | 1 | 253 |
| ý | chr(253) | 11111101 | 3 | 3 | 3 | 2 | 254 |
| þ | chr(254) | 11111110 | 3 | 3 | 1 | 3 | 255 |
| ÿ | chr(255) | 11111111 | 3 | 3 | 3 | 3 | 256 |

PHASED INFORMATION PULSE METHOD AND APPARATUS

FIELD OF THE INVENTION

This invention relates to phasing a digital information pulse resulting in changing the data information bit from the current two state binary to a multi-state digital schema. The method communicates data in a multi-phased format by converting information to a binary pulse using an existing digitizer; feeding the binary pulse to a bit/reference converter at the sending end that converts the binary pulse to a phased information pulse at the sending end and then converting the phased information pulse back to the binary pulse at the receiver end. The invention expands the value of the phased information pulse from a two state binary bit of zeros and ones to multi-state values of zero, one, two or three. This allows information that was sent over the existing process with zeroes and ones in eight positions to now being sent in four positions with the multi-state schema.

BACKGROUND OF THE INVENTION

Electrical telegraph was developed and patented in the United States in 1837 by Samuel Morse. He and his assistant, Alfred Vail, developed the Morse code signaling alphabet. The first telegram in the United States was sent by Morse on Jan. 11, 1838, across two miles (3 km) of wire at Speedwell Ironworks near Morristown, N.J.

In Morse code:
A dot equals one unit
A dash equals three units
A space between characters is three units
The space between words is seven units
The above is illustrated as follows:

| | | | | | |
|---|---|---|---|---|---|
| A | • | — | | | |
| B | — | • | • | • | |
| C | — | • | — | • | |
| D | — | • | • | | |
| 1 | • | | | | |
| 2 | • | • | | | |
| 3 | • | • | • | — | — |

Electronic information transmission from the early days of telegraph to current networks and applications continues to use a binary (zeros/ones or short or long signal) format.

As noted in Wikipedia, around 1930, the CCITT introduced the International Telegraph Alphabet No. 2 (ITA2) code as an international standard, which was based on the Western Union code with some minor changes. The US standardized a version of ITA2 called the American Teletypewriter code (USTTY) which was the basis for 5-bit teletypewriter codes until the debut of 7-bit ASCII in 1963.

Table 1 below is an example of a portion of the ITA2 Code:

TABLE 1

| International telegraphy alphabet No. 2 (Baudot-Murray code) | | | |
|---|---|---|---|
| Pattern of impulses 1 = mark 0 = space | | | |
| msb on left | msb on right | Letter shift | Figure shift |
| 00000 | 00000 | Null | Null |
| 00100 | 00100 | Space | Space |

TABLE 1-continued

| International telegraphy alphabet No. 2 (Baudot-Murray code) | | | |
|---|---|---|---|
| Pattern of impulses 1 = mark 0 = space | | | |
| msb on left | msb on right | Letter shift | Figure shift |
| 10111 | 11101 | Q | 1 |
| 10011 | 11001 | W | 2 |
| 00001 | 10000 | E | 3 |
| 01010 | 01010 | R | 4 |
| 10000 | 00001 | T | 5 |
| 10101 | 10101 | Y | 6 | msb — most significant bit

ASCII could support many additional characters. ASCII was the most common character system encoding on the World Wide Web until December 2007 when it was surpassed by UTF-8, which includes ASCII as a subset, continuing to use zeros and ones binary format. An illustration of ASCII appears in Table 2 below

TABLE 2

| Text | ASCII | Binary |
|---|---|---|
| H | chr(72) | 01001000 |
| I | chr(73) | 01001001 |
| J | chr(74) | 01001010 |
| K | chr(75) | 01001011 |
| L | chr(76) | 01001100 |
| M | chr(77) | 01001101 |
| N | chr(78) | 01001110 |

Alpha, numeric, control characters and information are converted from the original form to binary form through a digitizer in the above codes.

Digitizing is defined by Wikipedia as the representation of an object, image, sound, document or signal (usually an analog signal) by generating a series of numbers that describe a discrete set of its points or samples. The result is called digital representation or, more specifically, a digital image for the object, and digital form for the signal. In modern practice the digitized data is in the form of binary numbers, which facilitates computer processing and other operations. Strictly speaking, digitizing simply means the conversion of analog source material into a numerical format; the decimal or any other number system can be used instead.

One interesting/terrifying aspect of today's modern society is that we have filled the airwaves with a multitude of radio signals. Ever since the pioneering days of Marconi, Braun, and others we have been using more and more of the electromagnetic spectrum to send audio, visual, and data signals. Everything from FM radio to 4G LTE, from digital satellite TV to military communication is all sent via one form of radio or another. The result is that the radio spectrum is full, it is bursting at the seams.

In light of this, DARPA (the Defense Advanced Research Projects Agency) has launched its latest Grand Challenge, this time to bring advanced machine-learning capabilities to the way the radio frequencies are used. DARPA has named the new competition the Spectrum Collaboration Challenge (SC2). The object is to use AI to squeeze more bandwidth out of the airwaves.

Considerable prior art exists showing the transmission of binary numbers such as U.S. Pat. No. 4,253,185 to Danielsen. Also many patents pertain to wireless communication and data transmission showing use of binary numbers such as U.S. Pat. Nos. 9,252,823; 8,819,517; and, 5,771,238. The problem is that the expansion of wireless service is taxing the limits of the binary format potentially requiring the costly expansion of the system. The use of a phased information pulse described herein greatly improves the network, as well as device and equipment capacity utilization while increasing throughput speed and reducing power consumption.

SUMMARY OF INVENTION

This invention proposes the use of phased information pulses to communicate data in a multi-phased digital format. Rather than the two binary information bits used today, this invention proposes use of a multi-state schema wherein the position of the information bit is phased, thus providing additional characters. A bit/reference converter converts binary to a phased information digit then to a phased information pulse at the sending end of a data transmission system and the phased information pulses back to binary at the receiving end.

The use of a phased information pulse improves network, device and equipment capacity utilization and data transfer speeds and reduces the significant investment needed to increase network, device and equipment capacity. This innovation also reduces the power consumption of cloud server centers and devices. Applications requiring greater data capacity particularly the introduction of new devices is a constant in today's world. This invention proposes the use of multiple characters, initially a four digit (0/1/2/3) schema that will increase data capacity of an 8-bit one-byte word 256 fold. Thus the same networks are able to easily and inexpensively increase capacity and data transfer speeds.

Accordingly, it is an object of this invention to use a phased information pulse to transmit and/or store data.

It is another object of this invention to provide a bit reference converter to convert binary pulses to a phased information pulse for transmission over a network and then back to binary at the receiving end.

It is another object of this invention to reduce the number of servers in cloud computing using phased information pulses in a multi-state digital schema.

It is a still further object of this invention to alleviate capacity exhaustion of bandwidth in wireless networks using a new multi-digit schema to free capacity between the cell network and device.

It is a still further object of this invention is to improve capacity utilization of communication networks, speed data transfer, increase utilization of the wireless spectrum and cloud computing servers while lessening power consumption by changing the transmission of a current two state binary pulse to a multi-state schema.

A more specific object of this invention is to use phased information pulses to communicate data in a multi-phased digital format wherein the position of a binary information bit at the sending end of a transmission system is phased thus providing additional characters for transmission and wherein said phased information pulses are converted seamlessly back to binary at the receiving end of the system thereby increasing the capacity utilization of the network.

BRIEF DESCRIPTION OF DRAWINGS

The above and other objects of this invention may be more clearly seen when viewed in conjunction with the accompanying drawings wherein:

FIG. 2 shows the communication of lower case "j" as binary and as quad, one of the schemas proposed by this invention.

FIG. 3 provides the full set of mapped combinations of FIG. 2. Once the binary is mapped to multi-state, phasing of the pulse is performed. In the example the phasing is as follows:

Figure 1:
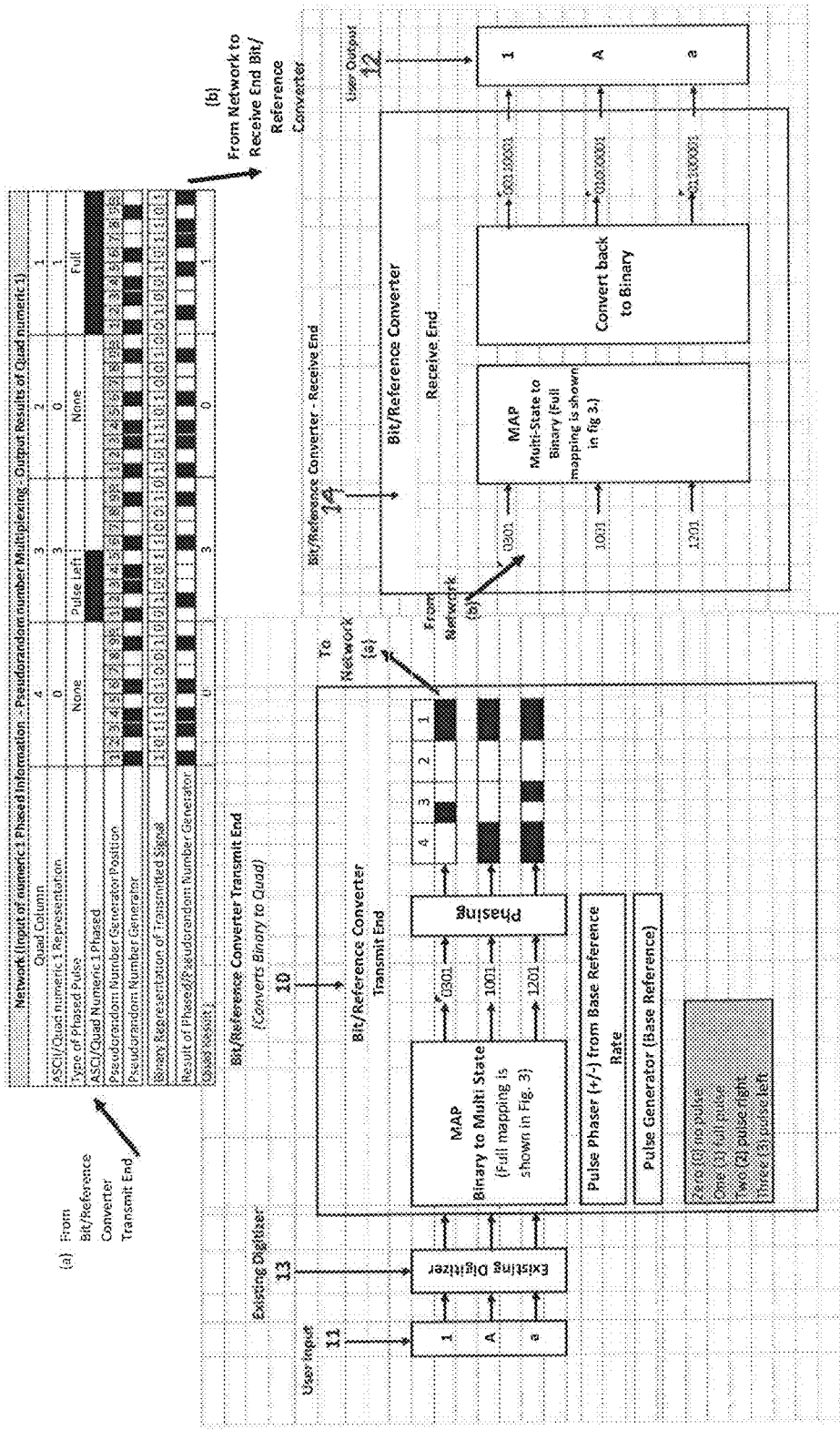
FIG. 1 is an illustration of a bit/reference converter which provides the conversion of binary to phased pulses. Existing digitizing processes convert analog characters to two state binary. This innovation converts that binary to multi-state digits mapping from binary to multi-state in the MAP converter and then back to binary at the receiver end.

0 no pulse
1 full pulse
2 early pulse, early in time to the right
3 late pulse, late in time to the left

DETAILED DESCRIPTION OF THE INVENTION

The Phased Information Pulse (PIP) of this invention uses a multi-state schema based on positioning of the information pulse. This provides higher efficiency of data transmission and opens new opportunities in the evolution of the information age.

Specifically, the PIP invention involves:
1. Use of a multiple phased information pulse versus the two binary information bits used today. As an example, in a four state schema the position of the information bit is phased to provide additional characters. In a quad (4) arrangement they are zero, one, two, and three versus zero and one used in binary today. In a quinary (5) arrangement they are zero, one, two, three and four.
2. A Bit/Reference Converter 10 as shown in FIG. 1 that converts binary to a phased information pulse at the sending end 11 and phased information to binary in the converter 14 at the receiver end 12.

The PIP will improve network capacity utilization, data transfer speeds, device performance, cloud equipment utilization and reduce power needs. The initial introduction can be introduced transparently to end users. Transition can evolve from initial improved network utilization to cloud server farm performance improvements, to support of the Internet of Things, video and new IT applications.

Future enhancements can utilize expanded combinations of information management. In the case of a quad schema 65,536 unique combinations are available in the eight characters of one byte. The quad plan can also be expanded based on quality and field performance to a five state schema of over 390K unique combinations.

Information systems use the binary format (0/1) from a digitizer 13 for computing and transmission of information. As the Information Age continues to evolve and the need for information grows, networks are exhausting capacity. Significant investments are necessary to increase network capacity since applications require greater data capacity as new devices are introduced. Evolution plans, however, continue to use a binary schema.

The invention provides an evolution from two-digit binary (0/1) to multiple characters, initially a 4 digit (0/1/2/3) schema that will increase data capacity of an 8-bit, one-byte word 256 fold. In the PIP arrangement, the 256 combinations of an eight-bit binary byte are communicated in four quad characters, initially doubling capacity. Future evolution can expand beyond the quad. The evolution will be based on quality and performance. In a quad arrangement, the solution provides 65,536 unique combinations, an increase of 256 fold from binary. The advantages of the phased information pulse are shown in Tables 3 and 4.

TABLE 3

Existing Binary Schema Using Eight Bits

| Bit | 1 | 2 | 3 | 4 | 5 | 6 | 7 | 8 |
|---|---|---|---|---|---|---|---|---|
| Binary Bit | 0/1 | 0/1 | 0/1 | 0/1 | 0/1 | 0/1 | 0/1 | 0/1 |
| Combinations | 2 | 4 | 8 | 16 | 32 | 64 | 128 | 256 |

TABLE 4

Proposed Using a Quad Schema in Eight Bits

| Bit | 1 | 2 | 3 | 4 | 5 | 6 | 7 | 8 |
|---|---|---|---|---|---|---|---|---|
| Phased Bit Combination | 0/1/ 2/3 | 0/1/ 2/3 | 0/1/ 2/3 | 0/1/ 2/3 | 0/1/ 2/3 | 0/1/ 2/3 | 0/1/ 2/3 | 0/1/ 2/3 |
| Combinations | 4 | 16 | 64 | 256 | 1,024 | 4,096 | 16,384 | 65,536 |

The five-state schema (quinary) uses five conditions, the same four used in the quad plus a center pulse providing a fifth condition. Applications can be used for video. A video pixel contains 24 unique colors. These 24 colors would be transmitted and managed with two bit positions of 5 (2 to the $5^{th}$ power=25).
  a) no information (no pulse)=0;
  b) a full pulse=1;
  c) a phased pulse to the right or early=2;
  d) a phased pulse to the left or late=3 and
  e) a centered phased pulse=4.

TABLE 5

Proposed Using a quinary Schema in Eight Bits

| Bit | 1 | 2 | 3 | 4 | 5 | 6 | 7 | 8 |
|---|---|---|---|---|---|---|---|---|
| Phased Bit Combination | 0/1/ 2/3/4 | 0/1/ 2/3/4 | 0/1/ 2/3/4 | 0/1/ 2/3/4 | 0/1/ 2/3/4 | 0/1/ 2/3/4 | 0/1/ 2/3/4 | 0/1/ 2/3/4 |
| Combinations | 5 | 25 | 125 | 625 | 3125 | 15,625 | 78,125 | 390,625 |

The PIP continues to use binary data somewhat the same as it is used today except the binary code is converted to a phased pulse in the Bit/Reference Converter 10 shown in FIG. 1. The converted data is transmitted in the new schema over existing transmission protocols and the receiving end converts the phased schema back to binary in the receiving Bit/Reference Converter 14.

In a four state schema the characters are as follows:
  a. No information (no pulse)=0
  b. A full pulse=1
  c. A phased pulse to the right or early=2
  d. A phased pulse to the left or late=3

It is noted that the assignment of 0, 1, 2, and 3 is an example. The final assignment can be defined through standards bodies. Future evolution of the concept can be expanded to over 1000 different combinations.

Table 6 below is an example of the four state phased information pulse:

TABLE 6

| 0 | 1 | 2 | 3 |
|---|---|---|---|
| NoPulse Equals 0 | PULSE Full Pulse Equals 1 | PULSE Pulse to the Right or early Equals 2 | PULSE Pulse to the Left or late Equals 3 |

Table 7 below is an example of binary to quad. Lowercase "j" will be used to explain the concept.

TABLE 7

| | | | Quad | | | |
|---|---|---|---|---|---|---|
| Text | ASCII | Binary | Position 4 | Position 3 | Position 2 | Position 1 |
| M | chr(77) | 01001101 | 1 | 0 | 3 | 2 |
| N | chr(78) | 01001110 | 1 | 0 | 1 | 3 |
| j | chr(106) | 01101010 | 1 | 2 | 0 | 3 |
| k | chr(107) | 01101011 | 1 | 2 | 3 | 0 |

Table 6 above is a partial sample of the 65,536 rows of eight-character quad combinations. The full table is provided in FIG. 3.

Figure 2:
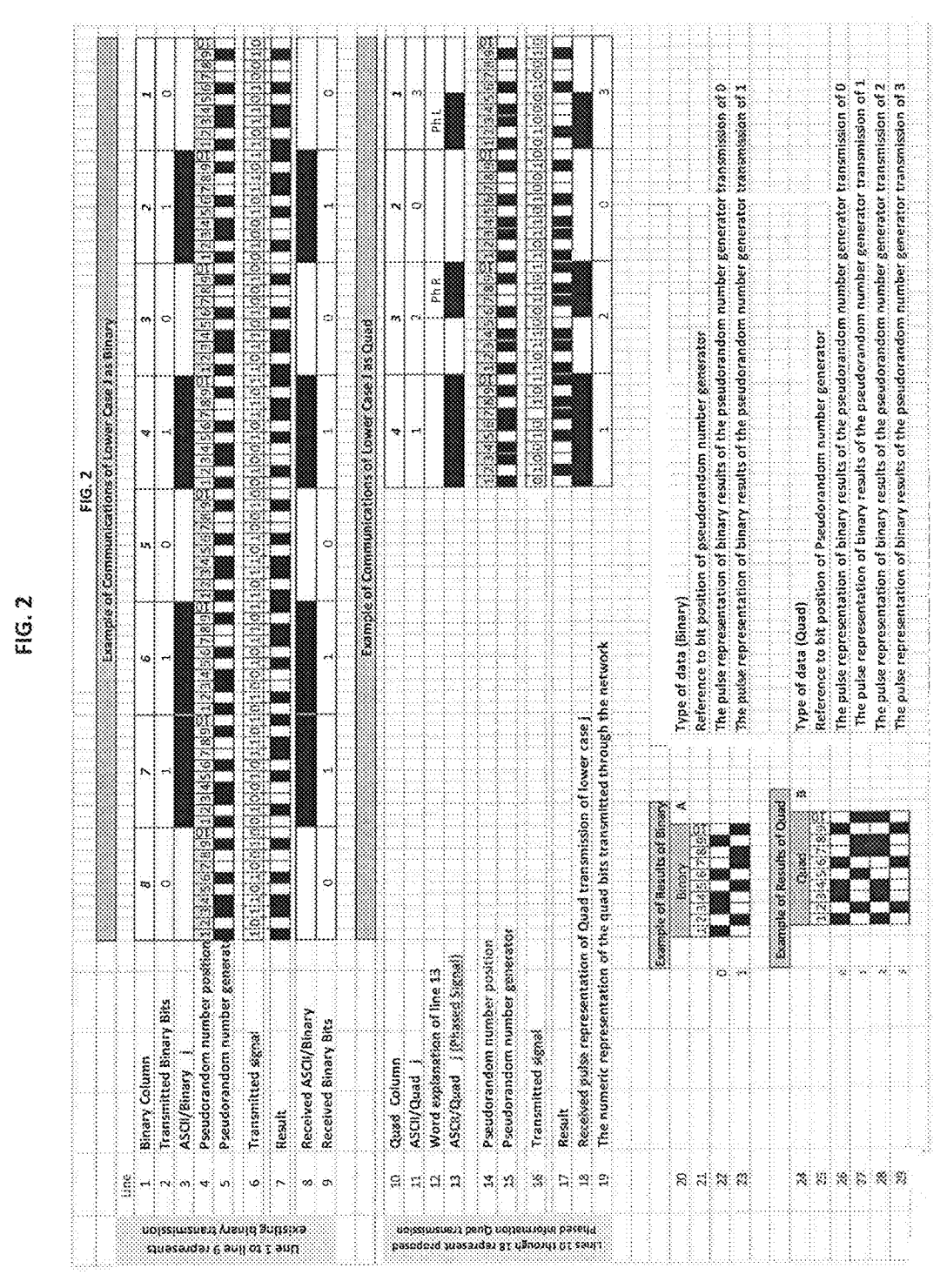

Referring to FIG. 2 of the drawings, this an example how a lower case j is communicated in binary (01101010) and the Phased Information Pulse (1, 2, 0, 3) format.

The example above illustrates how today a lower case j is translated in eight-bit binary over a CDMA wireless code using a Pseudorandom number generator and then re-assembled back to the original binary code resulting in lower case j.

In the second example comprising a quad column, a lower case j is translated into four phased information characters, sent over the same CDMA wireless code using a Pseudorandom number generator and re-assembled back to the phased code resulting in a lower case j.

Specifically, in FIG. 2, the following is shown:
Line 1 Binary Column—provides reference to the eight positions of a binary eight bits
Line 2 Transmitted Binary Bits—provides the binary bits transmitted for lower case j (01101010)
Line 3 ASCII/Binary j —provides a reference to the binary pulse —clear no pulse, black pulse in reference to lower case j
Line 4 Pseudorandom number column—provides reference to ten positions of the pseudorandom modulation code
Line 5 Pseudorandom number generator—provides an example and reference to the binary pseudorandom modulation code result of the bitwise result from line 2 and 5
Line 6 Transmitted signal—provides the bitwise numeric result to the binary pseudorandom modulation
Line 7 Binary Bit Transmitted—provides in binary form the information transmitted from the bitwise result of line 3 and line 5. Table A provides reference to how the first Transmitted Result 1011010010 results in a binary 0. The second Transmitted Result ten digit block 0100101101 results in binary 1.
Line 8 Received ASCII/Binary—received ASCII/Binary provides the binary result of line 7
Line 9 Received Binary Bits—provides the binary digits received for lower case j
Line 10 Quad Column—provides reference for the four positions of quad Line 11 ASCII/Quad j—provides the quad bits for lower case j as referenced in FIG. 3

Line 12 Note on Phased Pulse position—provides the phased position of the information pulse as shown on line 13

Line 13 ASCII/Quad j—provides a reference to the quad pulse —black full pulse (1) clear no pulse, phased right pulse (2), clear no pulse (0), phased left pulse (3) in reference to lower case j Line 14 Pseudorandom number column—provides reference to the ten positions of the pseudorandom modulation example Line 15 Pseudorandom number generator—provides an example and reference to the binary pseudorandom modulation Line 16 Transmitted signal—provides bitwise numeric result to the binary pseudorandom modulation Line 17 Binary Bit Transmitted—provides in binary the information transmitted of the bitwise result of line 13 and line 15. Table B provides reference to how the first Transmitted Result 010010101 results in a quad 1. The second Transmitted Result ten digit block 1011001101 results in quad 2. The third Transmitted Result ten digit block 1011010010 results in quad 0. The fourth Transmitted Result ten digit block 0100010010 results in quad 3.

Line 18 Received Quad signal—provides a numeric reference of the bitwise result of line 13 and line 15. 1, 2, 0, 1 represents lower case j in the quad as shown in FIG. 3.

The initial applications can be unobvious to the end user. The transition can be as follows and alleviate capacity exhaustion of bandwidth in wireless networks. In a transition, existing applications would remain binary and a binary to quad converter in the cell network and in new next generation devices would use the new 4-digit schema to free capacity between the cell tower and the device. The interface would allow the applications to remain unchanged to the user. Similar transitions can be used in Wi-Fi or terrestrial communications as well as in cloud server farms Backbone networks could internally implement the 4-digit schema for capacity increases. As in the wireless application, a Bit/Reference Converter 10 shown in FIG. 1 at the network equipment would allow the applications to remain the same using a binary format. End devices, applications and equipment can evolve next over time in a dual mode and use the new Phased Information Pulse schema for capacity and speed and the existing binary format for continuity. Once the networks and devices are in place, applications and new services can be designed utilizing the increased capacity and functionality. The full Phased Information Pulse capability can then be introduced into applications.

The future evolution of the phased pulse schema can involve video transmission/management using phased management to improve bandwidth utilization, an evolution to mapped interface between source and user and improved security capabilities. The support of new application opportunities along with significant transport and wireless spectrum capacity utilization improvements are further advantages.

The Bit/Reference Converter 10 function is to transition binary to multi-state at the transmit end 11 and multi-state to binary at the receiving end 12. FIG. 3 provides the cross reference of the 256 ASCII characters to the 65,536 quad numbering combinations. Note in FIG. 3 only 256 of the quad combinations are assigned to match the 256 ASCII characters. The remaining combinations are for future use. Also note that other tables can be established in a multi-state schema, such as fives resulting in 390,625 unique combinations. The invention is not limited to the examples shown.

With the evolving Internet of Things much communication may be machine to machine using pre-planned reports of events. Using a multi-state table as an example, a table of quad, 65,536 pre-planned identified events and status can be exchanged with one eight bit, one-byte word resulting in capacity utilization savings, improved bandwidth utilization and increased speed. Expanding to a five-character schema, the combinations expand to 390,625 unique combinations.

Transmission of video over the internet/wireless networks uses large amounts of data. To reduce the amount of data requires various types of compression such as h.265 and/or others. These methods reduce the data demands, however they still result in large data usage. Expanding to a five-character schema the combinations expand to 390,625 unique combinations and mapping can result in reduction of data required to transmit High Definition Video. Details will be provided in a separate patent application.

Cloud Computing continues to expand requiring significant investments in servers. The number of servers can be reduced using a Phased Information Pulse and multi-state digital schema. Powering the Cloud Computing servers is a significant expense that can be reduced through the use of Phased Information Pulse and multi-state digital schema reducing the number of servers required to store the equivalent amount of data stored in a binary format.

As technology companies continue to evolve with new features such as built-in digital assistant and the Internet of Things the Multi-state PIP can provide expanded capabilities utilizing increased speed and less resources. The Invention can also be introduced transparently to end users. Initial applications can be in the communications and hosted cloud servers. As the concept evolves user facing applications can be introduced.

More specifically, as illustrated in FIG. 2, analog information (in this example lower case j) is processed through an existing digitizer 13 into binary code of zeros and ones. The digitized lower case j on line 2 is a one byte, eight-bit binary code 01101010. To transmit the binary code over a wireless network it is multiplexed with a pseudorandom number generator of ten bits per block 1011010010 as shown on line 5. The algebraic result of the binary bit and pseudorandom number is the result that is transmitted on line 7, 1011010010. At the receiving end, the pseudorandom number is removed resulting in the binary bit. Table A illustrates a zero and one in the pseudorandom number format.

In the example of transmitting lower case j in a quad schema, lines 10 through 18 lower case j will be 1, 2, 0, 3. As in the binary example the quad numbers are multiplexed with the pseudorandom number generator of ten bits per block 1011010010. The algebraic result becomes one of four unique combinations as shown in Table B. The results are reflected as 1, 2, 0, 3 in four bit positions versus the eight bit positions of binary, thus resulting in a reduction of used spectrum for transmitting lower case j at twice the speed.

While the invention has been explained by a detailed description of certain specific embodiments, it is understood that various modifications and substitutions can be made in any of them within the scope of the appended claims, which are intended also to include equivalents of such embodiments.

What is claimed is:

1. A method of communicating information in a network having a transmit end and a receive end using a phased information pulse, the method comprising the steps of:
converting the information to a binary pulse using a digitizer;
feeding the binary pulse to a bit/reference converter in the network at the transmit end;
converting the binary pulse to the phased information pulse at the transmit end in the bit/reference converter;
mapping the phased information pulse from a two state binary code of eight binary bit positions of zeros and ones to multi-state phased code of four bit positions of zero, one, two, and three, wherein any eight binary bit position is reduced by half the necessary bandwidth to communicate the information; and
transmitting the phased information pulse to the receive end and then converting the phased information pulse back to the binary pulse at the receive end,
wherein the multi-state phased code is a multi-state schema using a position of the phased information pulse to provide additional characters of the zero, one, two, and three to improve network utilization and character speed.

2. The method in accordance with claim 1, further comprising the steps of:
providing a pseudorandom number generator;
providing a number of ten bits per block by the pseudorandom number generator;
multiplexing the two state binary code with the pseudorandom number generator at the transmit end; and
removing the multiplexed binary code and converting the phased information pulse to a two state binary information bit at the receive end resulting in a reduction of spectrum used to transmit the information at increased speed.

3. The method in accordance with claim 2 wherein:
the position of the phased information pulse is represented in the data transfer from the two state binary code of zeros and ones to the multi-state phased code of zero to three and is expanded using a quad schema comprising the following characteristic values:
a) no information (no pulse)=zero (0),
b) a full pulse=one (1),
c) a phased pulse to the right or early=two (2), and
d) a phased pulse to the left or late=three (3).

4. In a network having a transmit end including a bit/reference converter and a receive end, the bit/reference converter comprising:
means at the transmit end for mapping digitized binary data having eight binary bit positions of zeros and ones to multi-state data having four bit positions of zero, one, two, and three including:
a phase generator configured to generate a base reference pulse of the four bit positions; and
a pulse phasor coupled to the phase generator, said pulse phasor configured to shift the base reference pulse into one of four states representing each of the four bit positions in a phased pulse; and
means at the receive end for converting the phased four bit position pulse to a binary output by reversing the process of converting the phased pulse back to the eight binary bit positions of zeros and ones.

5. A method of transmitting information via a network independent of network type from a transmit end to a receive end of the network using a phased information pulse, the method comprising the steps of:
digitizing the information into a binary code of eight binary bit positions of zeros and ones at the transmit end of the network;
mapping the binary code to a multi-state phased code of four bit positions of zero, one, two, and three at the transmit end of the network;
providing a phase generator to generate a base reference pulse of the four bit positions;
providing a pulse phasor coupled to the phase generator to shift the base reference pulse into one of four states representing each of the four bit positions in a phased pulse;
providing a number of ten bits per block by a pseudorandom number generator;
multiplexing the phased multi-state code with the pseudorandom number generator forming one of the four bit positions versus the eight binary bit positions resulting in a reduction of used spectrum for transmission to the receive end at increased speed;
transmitting the phased multiplexed code to the receive end; and
removing the phased multiplexed code and converting the four bit positions to the eight binary bit positions at the receive end of the network.

* * * * *